United States Patent [19]

Collins

[11] Patent Number: 4,645,161

[45] Date of Patent: Feb. 24, 1987

[54] SUPPORT DEVICE

[76] Inventor: Harold O. Collins, 7551 E. North La., Scottsdale, Ariz. 85258

[21] Appl. No.: 760,976

[22] Filed: Jul. 31, 1985

[51] Int. Cl.⁴ .......................................... F16M 11/00
[52] U.S. Cl. .................................. 248/439; 248/165;
248/188; 248/188.6; 182/155; 182/185;
182/225; 108/132
[58] Field of Search ...................... 248/439, 440, 440.1,
248/165, 166, 188, 432, 231.3, 188.6; 108/131,
132, 135, 153; 182/155, 151, 153, 154, 185, 186,
225–227, 152; 297/157, 159

[56] References Cited

U.S. PATENT DOCUMENTS

| | | | |
|---|---|---|---|
| 1,600,823 | 9/1926 | Hess | 182/151 |
| 2,221,932 | 11/1940 | Utley | 248/439 |
| 2,271,332 | 1/1942 | Ellington | 248/439 |
| 2,859,066 | 11/1958 | Franklin | 182/155 |
| 3,529,697 | 9/1970 | Kossian | 182/186 |
| 3,599,751 | 8/1971 | Mueller | 182/155 |
| 3,695,567 | 10/1972 | Weagle | 108/132 |
| 3,730,465 | 5/1973 | Gonzalez | 248/439 |
| 3,739,876 | 6/1973 | Goldberg | 182/155 |
| 4,046,221 | 9/1977 | Edenfield | 182/155 |
| 4,226,301 | 10/1980 | McDaniel | 182/155 |
| 4,519,476 | 5/1985 | Alimbau | 182/151 |
| 4,569,555 | 2/1986 | Lehman | 295/157 |

FOREIGN PATENT DOCUMENTS

| | | | |
|---|---|---|---|
| 143255 | 5/1935 | Austria | 248/439 |
| 2509592 | 1/1983 | France | 108/157 |
| 2015934 | 9/1979 | United Kingdom | 297/157 |

Primary Examiner—Reinaldo P. Machado
Assistant Examiner—Alvin Chin-Shue
Attorney, Agent, or Firm—Walker & McKenzie

[57] ABSTRACT

A self-contained adjustable support device designed to provide stable work supporting surfaces for a wide variety of objects in the legs extended position and also provides a legs collapsed position for storage and/or transport. The support device includes a pair of latch brackets with each latch bracket constructed to lock a pair of legs to a central beam either in the legs extended position or the legs collapsed position; and to allow each pair of legs to be adjusted to various positions along the beam.

4 Claims, 12 Drawing Figures

SUPPORT DEVICE

BACKGROUND OF THE INVENTION

1. Field of the Invention

The present invention relates in general to means for stably supporting an object and more specifically to a self-contained, adjustable support device having a collapsed position for storage and/or transport and having an open position for providing stable supporting surfces for a wide variety of objects.

2. Description of the Prior Art

Heretofore, various devices have been used by carpenters and other workmen to support workpieces as the workpiece is cut, filed or otherwise worked on. Typically, such workmen use a pair of sawhorsed or tesles to support a workpiece or the like. However, typical sawhorses and tresles are often disadvantageous because they are typically not adjustable or collapsable and often do not have adequate strength. Other disadvantages include bulkiness, storage and transport difficulty and a tendency to become weakened through repeated use. Further, additional support means such as transverse rails and the like must be used in conjunction with such typical sawhorses and tresles when supporting small, large, odd shaped, or flimsey objects. A preliminary patentablility search in class 248, subclass 439 and class 182, subclasses 153, 154, and 155 produced the following patents: Fassler, U.S. Pat. No. 965,173; Varache, U.S. Pat. No. 1,150,794; Beland, U.S. Pat. No. 1,298,867; Tyler et al, U.S. Pat. No. 1,860,875; Strand, U.S. Pat. No. 1,876,787; Bowers, U.S. Pat. No. 2,897,911; Barthel, U.S. Pat. No. 3,817,349 and Hendrickson et al, U.S. Pat. No. 3,945,328. None of the above patents or prior art devices disclose or suggest the present invention.

SUMMARY OF THE INVENTION

The present invention provides a support device of general utility value, particularly useful to work men for supporting workpieces such as lumber or other objects for sawing, drilling, painting, repair and the like. The support device of the present invention comprises, in general, a support beam; leg structure; and bracket means pivotally attaching the support beam to the leg structure, the bracket means including pivot rod means extending through the beam member for allowing pivotal movement relative thereto, support means rigidly mounted relative to the pivot rod means for supportingly engaging the beam member, and attachment means rigidly mounted relative to the pivot rod means and the support means for attaching the pivot rod means and support means to the leg structure.

An object of the present invention is to provide a new and improved support device which is substantially compact, easily adjustable, collapsable, storable, transportable, and adequately strong, that does not become weak or wobbly through use, and that is substantially self-stabilizing on uneven floor or ground conditions.

Another object of the present invention is to provide a latch bracket which will lock a pair of legs to a central beam either in a legs extended position or a legs collapsed position, and which will allow each pair of legs to be adjusted to various positions along the beam.

An additional object of the present invention is to provide a support device which can be used as an individual means for support small, large, odd shaped, or flimsey objects by means of providing multiple support surfaces lying in substantially the same plane, thus eliminating the need for multiple support devices and/or supplemental support means for such objects and for supporting such objects in a way that a workman is not limited or hindered in access to the supported objects by the support device itself.

Another object of the present invention is to provide means for out-of-the-way storage of tools and the like.

Still another object of the present invention is to provide a construction of the support device which is simple, practical and economical to manufacture and to use.

Many other objects, advantages and/or features of the present invention will be at once apparent or will become so as the preferred embodiment of the present invention is hereinafter described.

DESCRIPTION OF THE PREFERRED EMBODIMENT

Figure 1:
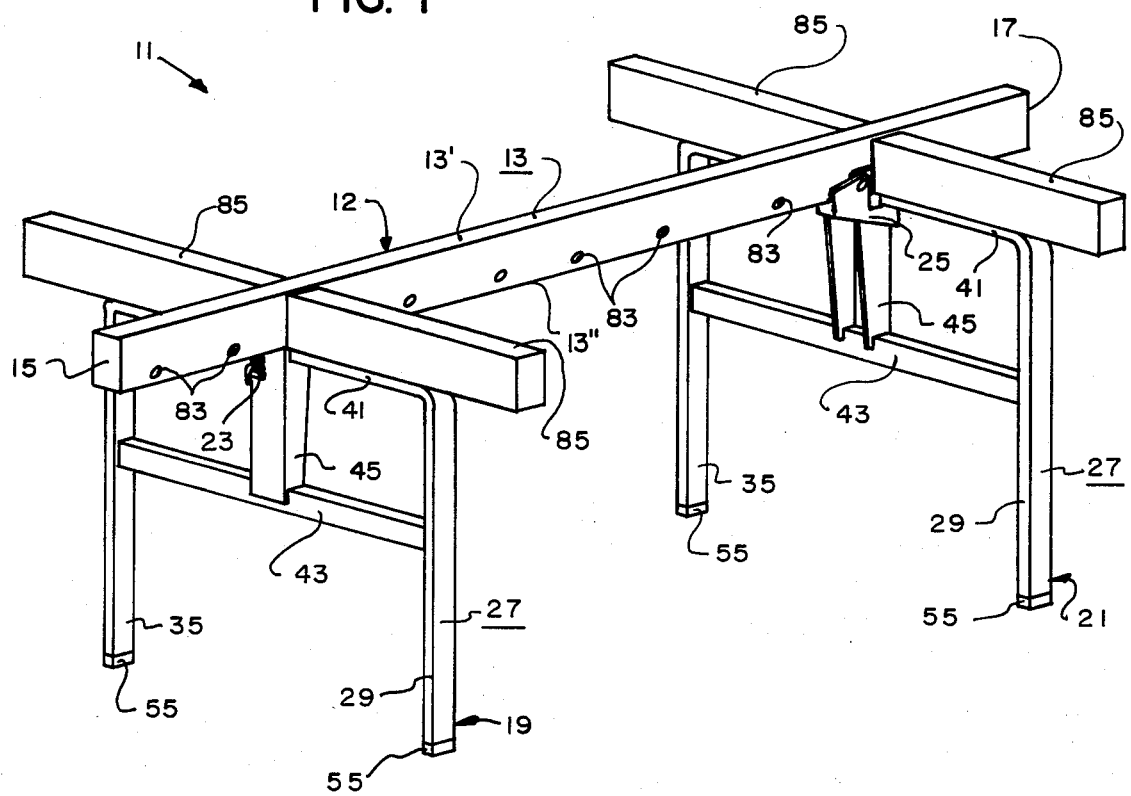
FIG. 1 is a perspective view of the support device of the present invention.
Figure 9:
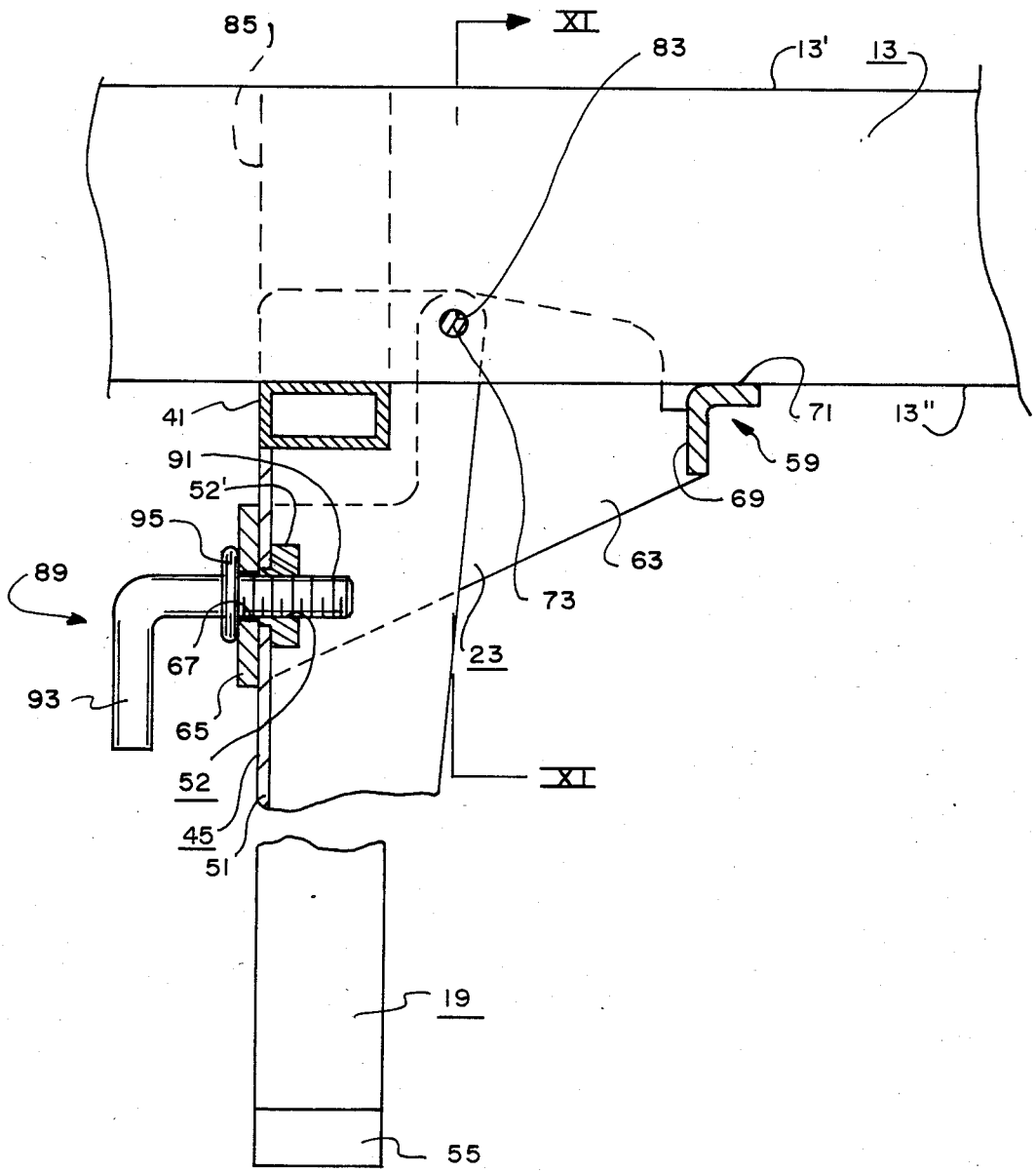
FIG. 9 is a somewhat diagrammatic sectional view of a portion of the support device of the present invention showing certain features of the first bracket means, the first leg means and support beam.
Figure 10:
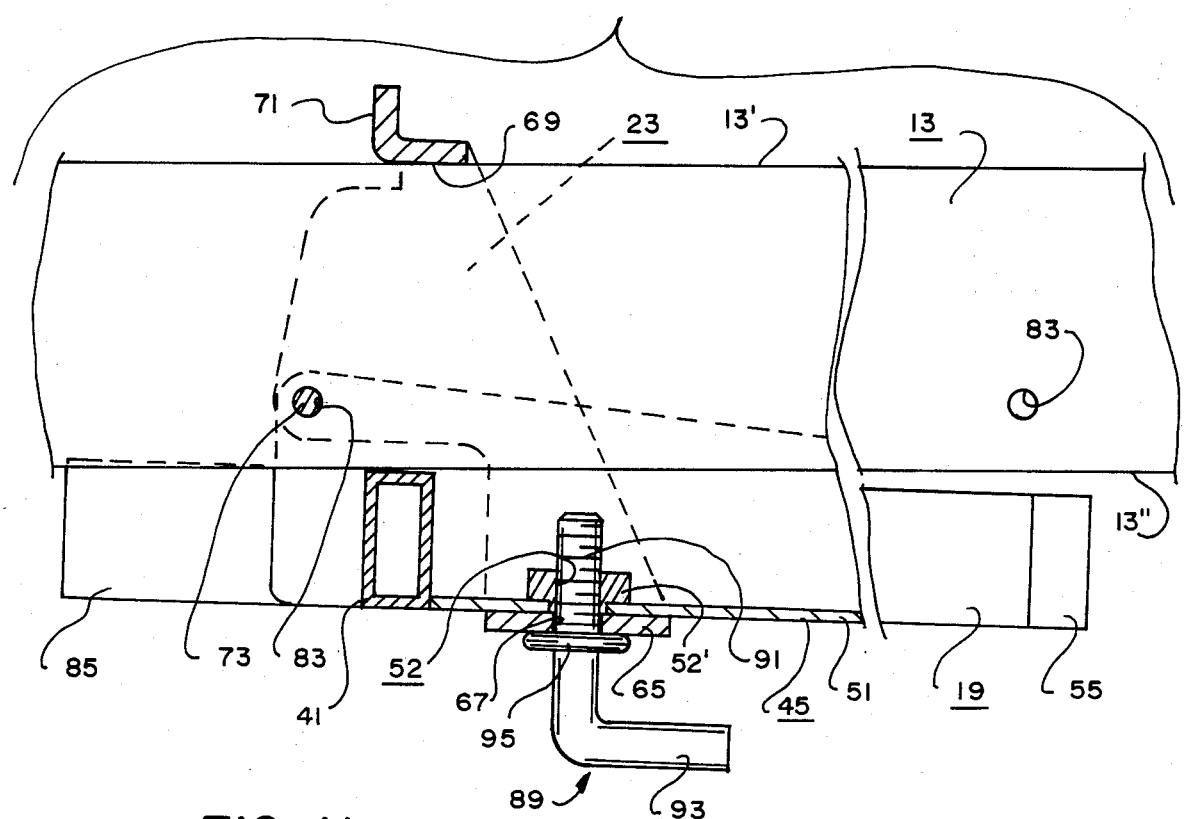
FIG. 10 is similar to FIG. 9 but shows the leg means in a folded, collapsed position.

The preferred embodiment of the support device 11 of the present invention as clearly shown in FIG. 1 includes a support structure or means 12 that includes an elongated longitudinal support beam member 13 having an upper surface 13' and a lower surface 13" (see FIGS. 11 and 12) and having a first end 15 and a second end 17; a first leg structure or means 19 for supporting the first end 15 of the support beam member 13; and a second leg structure or means 21 for supporting the second end 17 of the support beam member 13 ( see, in general, FIG. 1). A first bracket means 23 is provided to attach the first leg means 19 relative to the first end of the support beam member 13 and a second bracket means 25 is provided to attach the second leg means 21 relative to the second end 17 of the support beam member 13. The first and second bracket means 23, 25 are constructed so as to allow the first and second leg means 19, 21 to move between an extended, in use or open position with the leg means 19, 21 positioned substantially perpendicular to the support beam member 13 (see FIGS. 1, 6 and 9), and a collapsed, closed or stored position in which the leg means 19, 21 are positioned substantially parallel with the support beam member 13 (see FIGS. 7, 8 and 10).

Figure 3:
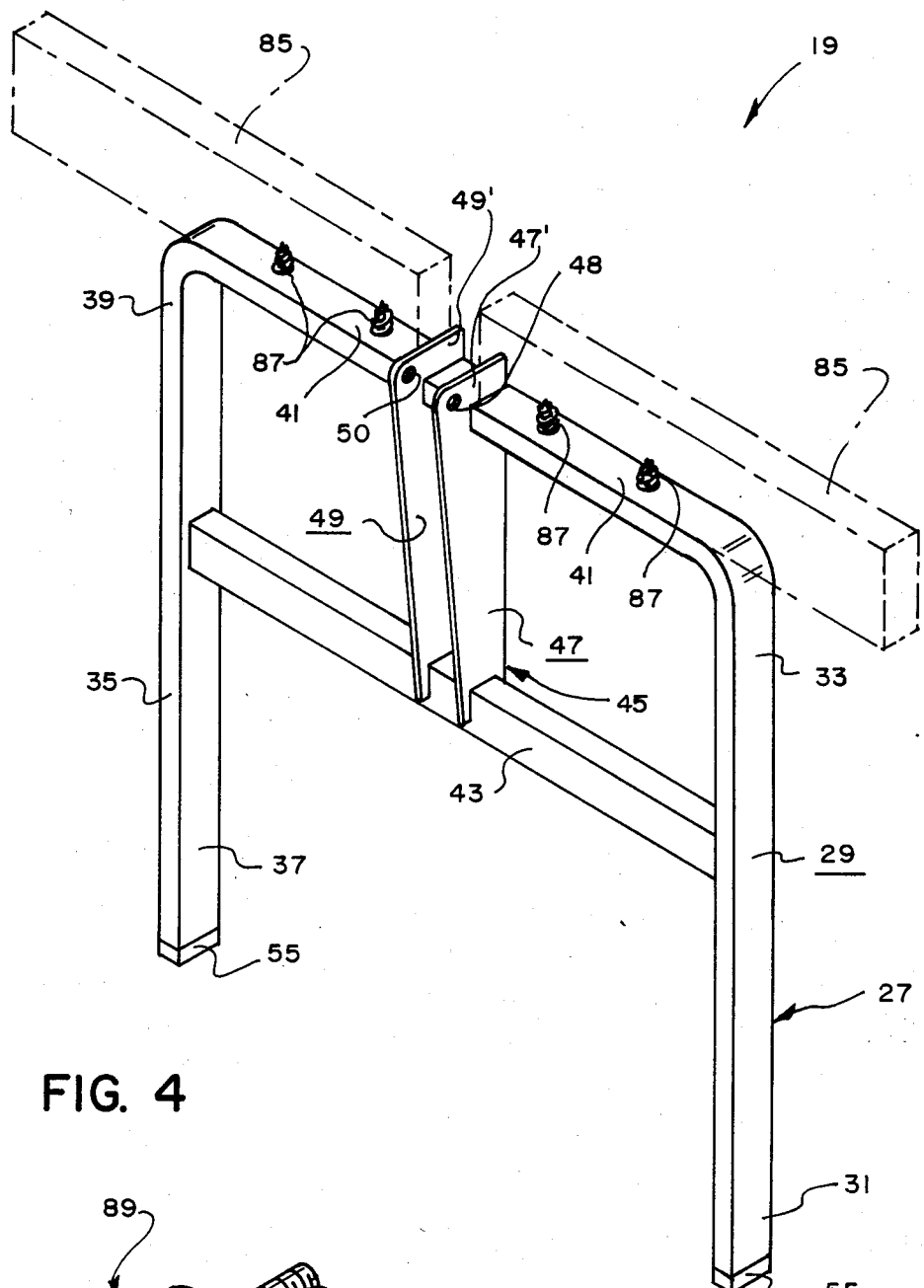
FIG. 3 is a perspective view of a leg means of the support device of the present invention with certain portions of the support beam structure shown in broken lines.

The first leg means 19 preferably includes an inverted substantially U-shaped body member 27 having a first leg 29 with a first end 31 and a second end 33, a second leg 35 with a first end 37 and a second end 39, and a web or bight portion 41 extending between the second end 33, 39 of the first and second legs 29, 35 (see, in general, FIG. 3). The body member 27 is preferably constructed of an elongated length of metal tubing which may be bent or otherwise formed to the inverted U-shape as will now be apparent to those skilled in the art. Thus, for example, the body member 27 may be constructed out of 18 gauge ¾ inch by 1½ inch rectangular metal tubing. A generally horizontal cross member 43 preferably extends between the first and second legs 29, 35 at a point between the first and second end thereof substantially parallel to the bight portion 41. The cross member 43 is preferably constructed of metal tubing and may be welded or otherwise fixedly attached to those skilled in the art. Thus, for example, the cross member 43 may also be constructed of 18 gauge ¾ inch by 1½ inch rectangular metal tubing. A strut 45 preferably extends bewteen the cross member 43 and the bight portion 41.

Figure 5:
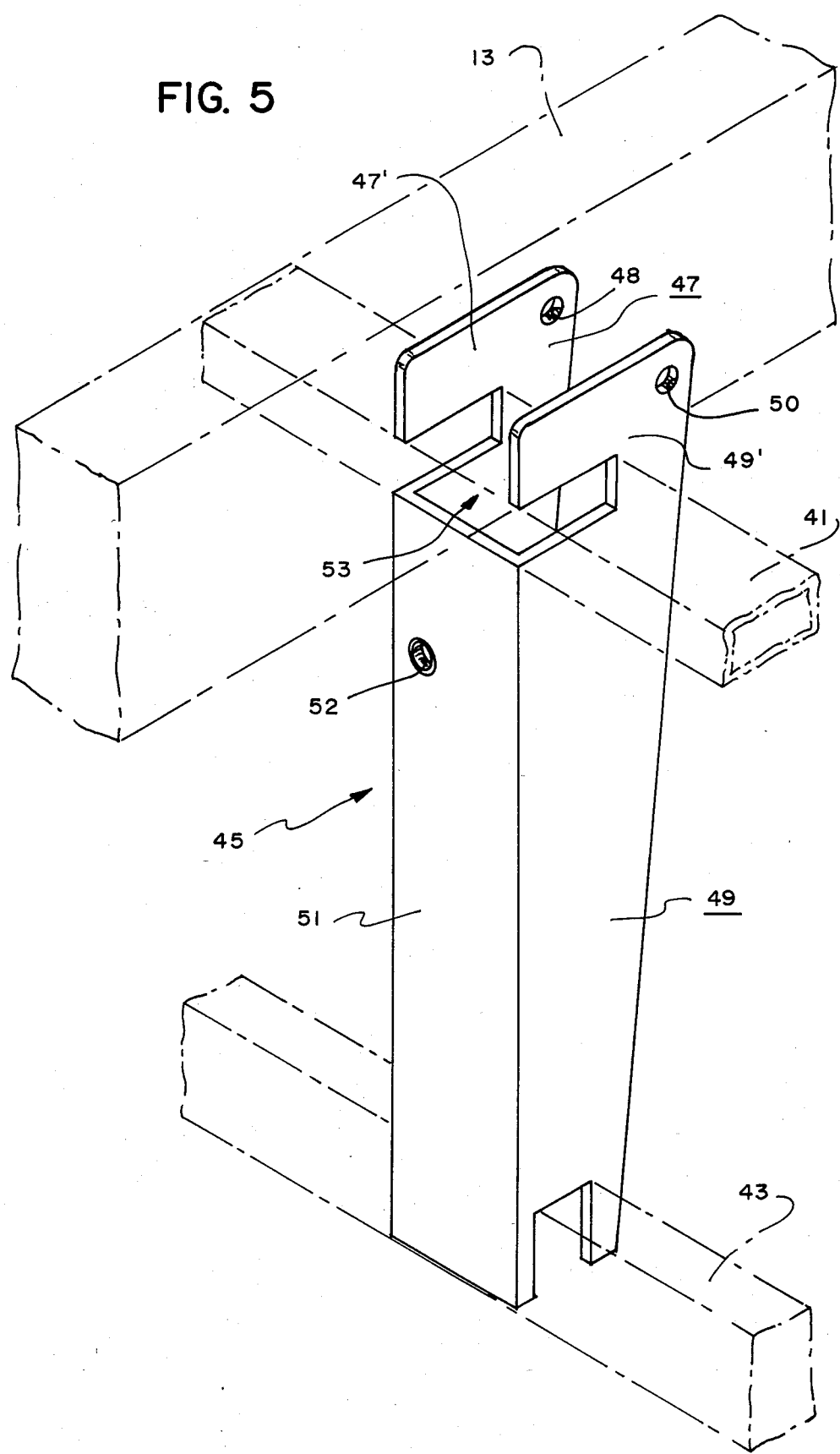
FIG. 5 is a perspective view of strut of the support device of the present invention with certain portions of the support beam structure and leg means shown in broken lines.

The strut 45 (see FIG. 5) is preferably channel-shaped having a first side portion 47 having an aperture 48 therethrough, a second side portion 49 having an aperture 50 therethrough, and a back portion 51 extending between the first and second side portions 47, 49. An aperture 52 is provided through the back portion 51 for reasons which will hereinafter become apparent. The aperture 52 is preferably adapted to screwably receive a threaded shaft as will hereinafter become apparent. Thus, the aperture 52 may be threaded as will be apparent to those skilled in the art or a threaded nut 52' (see FIGS. 9 and 10) may be fixedly attached to the back portion 51 concentrically of the aperture 52, etc. The strut 45 preferably has a notch 53 therein for receiving the bight portion 41 of the body member 27 as clearly shown in FIG. 3, thus allowing the upper ends or ears 47', 49', of the first and second side portions 47, 49 to extend above the bight portion 41 for reasons which will hereinafter become apparent. The strut 45 is preferably constructed of 14 gauge sheet metal or the like and may be easily cut and bent into the desired shape. The strut 45 may be fixedly attached to the cross member 43 and bight portion 41 in any manner now apparent to those skilled in the art such as by being welded thereto. Shoes 55 constructed of plastic or the like may be secured ot the first ends 31, 37 of the first and second legs 29, 35.

The second leg means 21 is preferably substantially identical in construction and function to the first leg means 19 and the above detailed description of the first leg means 19 should be referred to for a complete understanding of the second leg means 21. Similar parts and elements of the first and second leg means 19, 21 bear the same reference numerals in the drawings.

Figure 2:
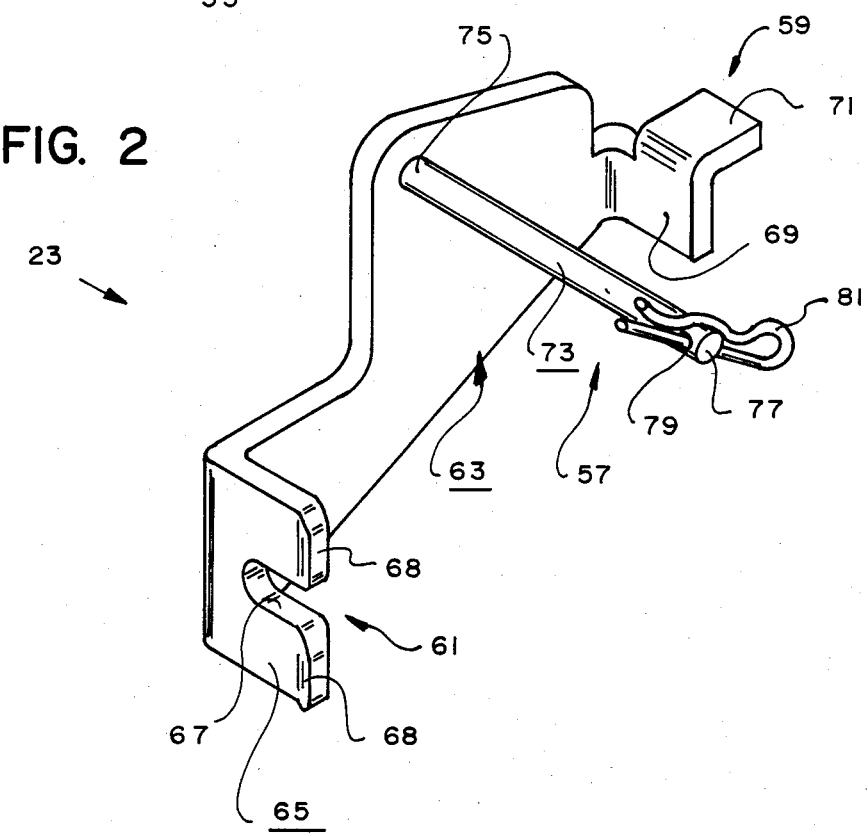
FIG. 2 is a perspective view of a bracket means of the support device of the present invention.

The first bracket means 23 (see, in general, FIG. 2) includes a pivot rod means 57 extending through the beam member 13 (see FIGS. 11 and 12) for allowing pivotal movement relative thereto. The first bracket means 23 also includes support means 59 rigidly mounted relative to the pivot rod means 57 for supportingly engaging the beam member 13, and attachment means 61 rigidly mounted relative to the pivot rod means 57 and the support means 59 for removably attaching the pivot rod means 57 and support means 59 to the first leg means 19. Preferably, the first bracket means 23 is constructed primarily of heavy gauge metal having a body portion 63 bent at one end to form a flange 65 having a slot 67 and outwardly angled distal ends 68 for defining the attachment means 61 in a manner which will hereinafter become apparent, and bent at the other end to form a first flange 69 and a second flange 71 which coact to define the support means 59 in a manner which will hereinafter become apparent. As clearly shown in FIGS. 2, 9 and 10, the outer faces of the first and second flanges 69, 71 are located perpendicular to one another for reasons which will hereinafter become apparent. The body portion 62 may have one or more strengthening or reinforcing flanges 72 (see FIGS. 11 and 12) extending the length thereof to increase the strength and stability of the bracket means 23 as will now be apparent to those skilled in the art. The pivot rod means 57 may consist simply of an elongated rod 73 such as a typical bolt or the like having a first end 75 fixedly secured to the body 63 by welding or the like and having a second end 77. The second end 77 of the rod 73 preferably has a transverse aperture 79 therethrough for removably receiving a hitch pin clip 81 or the like for reasons which will hereinafter become apparent.

The second bracket means 25 is preferably identical in construction and function to the first bracket means 23 and the above detailed description of the first bracket means 23 should be referred to for a complete understanding of the second bracket means 25. Similar parts and elements of the first and second bracket means 23, 25 bear the same reference numerals in the drawings.

The support beam member 13 preferably consists of an elongated length of lumber such as a typical "two by four" or the like. Transverse apertures 83 are provided through the support beam member 13 for allowing the rod 73 of the pivot rod means 57 of each bracket means 23, 25 to pass therethrough. Preferably, a plurality of spaced apart apertures 83 are provided along the length of the support beam member 13 to allow adjustment of the leg members 19, 21 toward and away from one another as will be apparent to those skilled in the art.

The support means 12 preferably includes structure for defining a pari of elongated, transverse support beam members located one substantially adjacent each end 15, 17 of the longitudinal support beam member 13 and positioned substantially transverse thereto. The transverse support beam members may be defined merely by the upper surfaces of the bight portions 41 of the first and second leg means 19, 21. Preferably, however, the transverse support beam members include a plurality of slats 85 for being fixedly attached to the upper surfaces of the bight portions 41 of the first and second leg means 19,2 1 as clearly shown in FIG. 1. Each slat 85 preferably consists of an elongated lumber such as a typical "two by four" or the like and is preferably fixedly attached to the respective bight portion 41 by lag screws 87 or the like with the upwardly extending ears 47', 49' of the side portions 47, 49 acting as end stops for the slats 85 (see FIG. 3). Thus, the upper surface 13' of the longitudinal support beam member 13 and the upper surfaces of the slats 85 are planar relative to one another whereby an object can be stably supported on the support means 12 even if it extends across the beam member 13 and one or more slats 85. The support means 12 is thereby defined by an elongated longitudinal surface having first and second ends, a first transverse surface extending across the longitudinal surface adjacent the first end thereof, and a second transverse surface extending across the longitudinal surface adjacent the second end thereof, with the longitudinal and transverse surfaces planar to one another and with the transverse surfaces located intermediate the first and second ends of the longitudinal surface.

Figure 4:
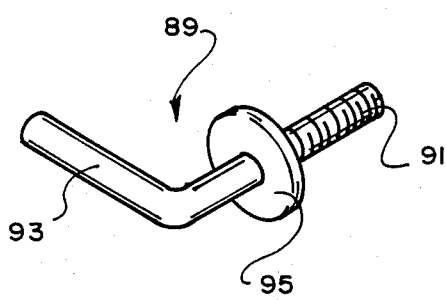
FIG. 4 is a perspective view of a thumbscrew of the support device of the present invention.

The attachment means 61 preferably includes a thumbscrew 89 (see, in general, FIG. 4) having a threaded body 91 for extending through the slot 67 in the flange 65 of the body 63 and into the threaded aperture 52 in the strut 45 to couple the respective bracket means 23, 25 to the respective strut 45. The thumbscrew 89 preferably has a head 93 for allowing it to be easily turned and a flange 95 for acting as a stop against the flange 65.

Figure 11:
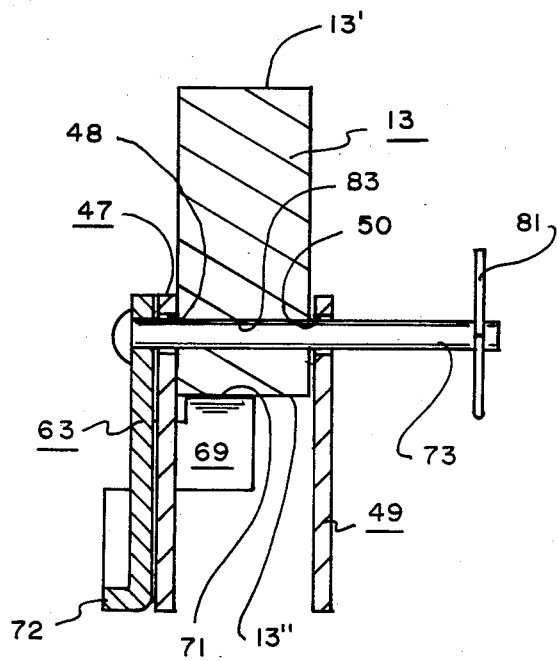
FIG. 11 is a sectional view substantially as taken on line XI—XI of FIG. 9.
Figure 12:
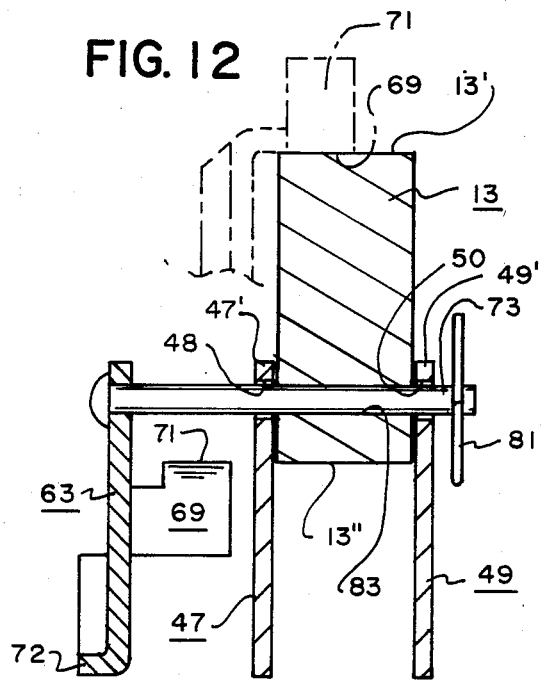
FIG. 12 is a sectional view similar to FIG. 11 but showing the bracket means in a moved position.

To connect the first leg means 19 to the support beam member 13 with the first bracket means 23, the support beam member 13 is positioned on the strut 45 between the upwardly extending ears 47', 49' of the first and second side portions 47, 49 thereof and with surface 13" adjacent to the upper surface of bight portion 41 of the bodymember 27, with one of the apertures 83 through the support beam member 13 aligned with the apertures 48, 50 through the first and second side portions 47, 51 of the strut (see, in general, FIG. 11). Then the rod 73 of the pivot rod means 57 is inserted through the aligned apertures 48, 50, 83. Once the rod 73 is inserted through the apertures 48, 50, 83, the hitch pin clip is inserted through the aperture 79 of the rod 73 to prevent inadvertent removal of the rod 73 from the apertures 48, 50, 83. the body 63 of the bracket means 23 can then be positioned so that the flange 65 is positioned adjacent to the threaded aperture 52 in the back portion 51 of the strut 45 with the slots 67 extending about the body 91 of the thumb screw 89 and with the flange 71 engaging the bottom of the beam member 13 (see FIG. 9). The thumb screw 89 can then be tightened to cause the support means and pivot means of the bracket means 23 to coact to wedge the support beam member 13 therebetween. More specifically, as the thumb screw 89 is tightened, the flange 95 thereof will cause the bracket means 23 to pivot somewhat about the pivot rod means 57 to cause the flange 71 to exert force against the lower surface 13" of the support beam member 13 (see FIG. 9) causing the lower surface 13" of the support beam member 13 to push against the bight portion 41 of the body member 27 while the lower radial surface of the rod 73 will exert force against the lower radial surface of the aperture 83. The outwardly angled distal ends 68 of the flange 65 will then coact with the wedge like force being applied to ensure that the bracket means 23 remains in position.

When the support device 11 is thus set up in the operative position with both leg means 19, 21 properly locked in place by way of the first and second brackets means 23, 25 respectively, the support device 11 will be structurely stable. Even if the support device 11 is set up on an uneven floor or ground surface, the construction allows the support device 11 to flex slightly and remain substantially stable.

To collapse the support device 11, the thumb screw 89 is loosened several turns. This will relieve the locking forces at the joint and allow the body 63 to be laterally moved to a position that by the time the hitch pin clip 81 comes in contact with the side portion 49 of strut 45, the flanges 65, 69, 71 are disengaged from the strut 45 and the beam member 13 respectively to allow the body member 27 to be rotated to a collapsed position (see FIG. 12).

To lock the body member 27 in the collapsed position, the body 63 is again moved laterally to position the flange 65 over the threaded aperture 52 and the thumb screw 89 is then tightened with the flange 69 engaging the upper surface 13' of the beam member 13 (see FIG. 12) to thereby lock the body member 27 in the collapsed position.

Figure 6:
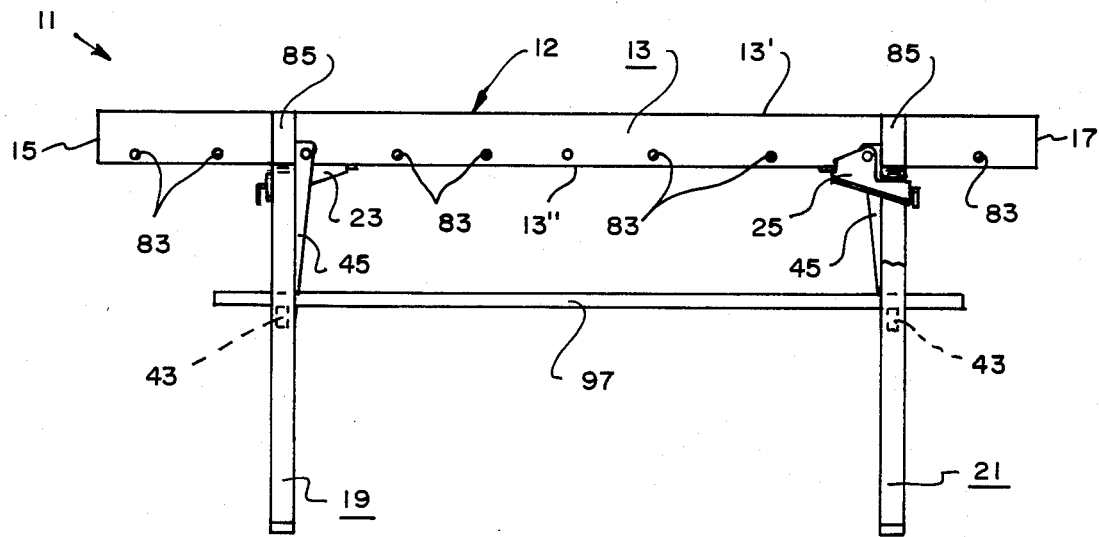
FIG. 6 is a side elevational view of the support device of the present inention with portions thereof broken away for clarity.
Figure 7:
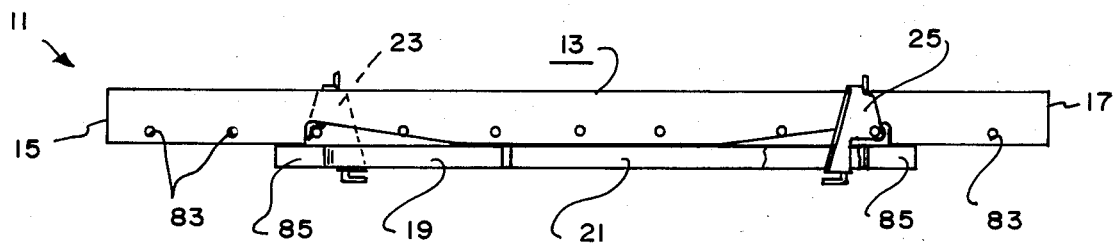
FIG. 7 is similar to FIG. 6 but with the leg means thereof in folded, collapsed positions.

A board 97 or a similar member may be positioned across the crossmembers 43 of the leg means 19, 21 when in the extended position as clearly shown in FIG. 6 to provide a shelf or the like for out-of-the-way storage of tools and the like.

Figure 8:
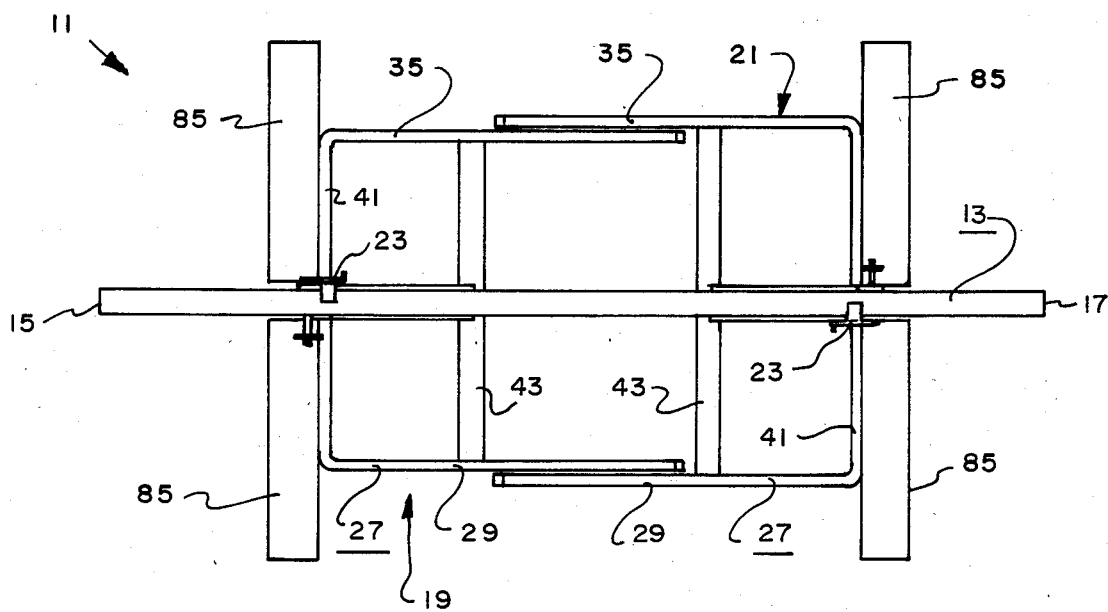
FIG. 8 is a top plan view of FIG. 7.

It should be noted that the first and second legs 29, 35 of the second leg means 21 may be spaced slightly farther apart from one another than the first and second legs 39, 25 of the first leg means 19 to allow portions of the first leg means 19 to nest within portions of the second leg means 21 when the support device 11 is in the collapsed position as clearly shown in FIG. 8.

From the above, it will be seen that all the recited objects, advantages, and features of the present invention have been demostrated as achievable in a highly practical and economical to manufacture and use embodiment of the present invention.

Although the present invention has been described and illustrated with respect to a preferred embodiment thereof and a preferred use therefore, it is not to be so limited since changes and modifications can be made therein which are within the full intended scope of the invention.

I claim:

1. A support device comprising:
(a) a support beam member having a bottom surface;
(b) leg structure; and
(c) bracket means pivotally attaching said support beam member to said leg structure for allowing said leg structure to pivot between an extended position and a collapsed position, said bracket means including pivot rod means extending through said beam member for allowing said beam member to pivot thereabout, said bracket means including support means rigidly mounted relative to said pivot rod means for supportingly engaging said bottom surface of said beam member, said bracket means including attachment means rigidly mounted relative to said pivot rod means and said support means for removably attaching said pivot rod means and said support means to said leg structure, said support means including means for supportingly engaging said beam member when said leg structure is in said extended position to positively lock said leg structure in said extended position and for supportingly engaging said beam member when said leg structure is in said collapsed position to positively lock said leg structure in said collapsed position, said attachment means being adjustable between a loose and a tight position while attached to said leg structure, the movement of said attachment means toward said tight position causing said support means and said pivot means to coact to wedge said support beam therebetween.

2. A support device comprising:

(a) a support beam member;
(b) leg structure; and
(c) bracket means pivotally attaching said support beam member to said leg structure, said bracket emans including pivot rod means extending through said beam member for allowing siad beam member to pivot thereabout, said bracket means including support means rigidly mounted relative to said pivot rod means for supportingly engaging said beam member, said bracket means including attachment means rigidly mounted relative to said pivot rod means and said support means for removably attaching said pivot rod means and said support means to said leg structure; said support beam member having a bottom surface and a top surface, said bracket means allowing said leg structure to pivot relative to said beam member between a first position with said leg structure located generally parallel with said beam member and a second position with said leg structure located generally perpendicular to said beam member; said support means of said bracket means including a first flange for supportingly engaging said top surface of said beam member when said leg structure is in said first position and includes a second flange for supportingly engaging said bottom surface of said beam member when said leg structure is in said second position.

3. The support device of claim 2 in which said first flange is located generally perpendicular to said second flange.

4. A support device comprising:
(a) an elongated longitudinal support beam member having a first end and a second end;
(b) first leg structure;
(c) a first bracket means attaching said first leg structure adjacent said first end of said support beam member for allowing said first leg structure to pivot between a first position in which the plane of said first leg structure is generally parallel with the plane of said support beam member and a second position in which the plane of said first leg structure is generally perpendicular to the plane of said support beam member, said first bracket means including pivot rod means for allowing said beam member to pivot thereabout, including support means rigidly mounted relative to said pivot rod means for supportingly engaging said beam member, and including attachment means rigidly mounted relative to said pivot rod means and said support means for removably attaching said pivot rod means and said support means to said first leg structure;

(d) a second leg structure;
(e) second bracket means attaching said second leg structure adjacent said second end of said support beam member for allowing said second leg structure to pivot between a first position in which the plane of said second leg structure is generally parallel with the plane of said support beam member and a second position in which the plane of said second leg structure is generally perpendicular to the plane of said support beam member, said second bracket means including pivot rod means for allowing said beam member to pivot thereabout, including support means rigidly mounted relative to said pivot rod means for supportingly engaging said beam member, and including attachment means rigidly mounted relative to said pivot rod means and said support means for removably attaching said pivot rod means and said support means to said second leg structure; said support beam member having a bottom surfce and a top surface; said support means of each of said bracket means supportingly engaging said bottom surface of said support beam member when said first and second leg structures are in said second position; said support means of each of said bracket means supportingly engaging said top surface of said support beam member when said first and second leg structures are in said first position; said attachment means of each of said bracket means being adjustable between a loose position and a tight position while attached to said leg structure, the movement of said attachment means toward said tight positions causing said support means and said pivot emans to coact to wedge said support beam member therebetween; said first leg structure having a threaded aperture therein, (f) a first bolt member screwably mounted in said threaded aperture of said first leg structure; said first bracket means having a slot defining at least in part said attachment means and through which said first bolt member extends, screwing said first bolt member into said threaded aperture of said first leg structure being effective to move said attachment means to said tight position; said second leg structure having a threaded aperture therein; and (g) a second bolt member screwably mounted in said threaded aperture of said second leg structure; said second bracket means having a slot defining at least in part said attachment means thereof and through which said second bolt member extends, screwing said second bolt member into said threaded aperture of said second leg structure being effective to move said attachment means to said tight position.

* * * * *

UNITED STATES PATENT AND TRADEMARK OFFICE
CERTIFICATE OF CORRECTION

PATENT NO. : 4,645,161

DATED : Feb. 24, 1987

INVENTOR(S) : Harold O. Collins

It is certified that error appears in the above-identified patent and that said Letters Patent is hereby corrected as shown below:

Column 1, line 10; change "surfces" to --surfaces--.

Column 1, line 16; change "sawhorsed" to --sawhorses--.

Column 1, line 17; change "tesles" to --trestles--.

Column 1, line 18; change "tresles" to --trestles--.

Column 1, line 25; change "tresles" to --trestles--.

Column 1, line 40; change "work men" to --workmen--.

Column 2, line 35; change "inention" to --invention--.

Column 3, line 26; after "attached" add --to the first and second legs 29, 35 as will now be apparent--.

Column 3, line 30; change "bewteen" to --between--.

Column 3, line 56; change "ot" to --to--.

Column 4, line 19; change "62" to --63--.

Column 4, line 50; change "pari" to --pair--.

Column 5, line 30; change "51" to --49--.

Column 7, line 5; change "emans" to --means--.

UNITED STATES PATENT AND TRADEMARK OFFICE
CERTIFICATE OF CORRECTION

PATENT NO. : 4,645,161

DATED : Feb. 24, 1987

INVENTOR(S) : Harold O. Collins

It is certified that error appears in the above-identified patent and that said Letters Patent is hereby corrected as shown below:

Column 7, line 6; change "siad" to --said--.

Column 8, line 20; change "surfce" to --surface--.

Column 8, line 34; change "emans" to --means--.

Signed and Sealed this

Sixth Day of October, 1987

Attest:

DONALD J. QUIGG

Attesting Officer

Commissioner of Patents and Trademarks